Feb. 26, 1957    R. W. FRENCH ET AL    2,782,709
BUNDLE TYING APPARATUS

Filed May 14, 1953    8 Sheets-Sheet 7

INVENTORS
Ralph W. French
Robert Shields
BY Kenneth H. Pond
Pennie Edmonds Morton Barrows Taylor
ATTORNEYS Feb. 26, 1957 R. W. FRENCH ET AL 2,782,709
BUNDLE TYING APPARATUS
Filed May 14, 1953 8 Sheets-Sheet 8

INVENTORS
Ralph W. French
Robert Shields
BY Kenneth W. Pond
Pennie Edmonds Morton Barrows Taylor
ATTORNEYS United States Patent Office 2,782,709
Patented Feb. 26, 1957

2,782,709

BUNDLE TYING APPARATUS

Ralph W. French, Ludlow, Robert Shields, Agawam, and Kenneth H. Pond, Longmeadow, Mass., assignors to Ludlow Manufacturing & Sales Co., Boston, Mass., a corporation of Massachusetts Application May 14, 1953, Serial No. 355,036

14 Claims. (Cl. 100—27)

This invention relates to machines for tying bundles and is concerned more particularly with an improved machine, which operates to wind twine about a bundle to form a wrap of one or more turns and to secure the ends of the wrapped twine together by means of a metal clip. The new machine is simple in construction and easy to operate and it can be used in the wrapping of bundles of a wide range of sizes. Simple adjustments in the machine make possible the use of twine of different weights and only minor modifications in the machine are required to enable it to wrap bundles of different sizes.

The machine is provided with a bundle support or table having spaced fixed and island sections and with a wraping arm rotatable on an axis parallel to the top of the table. Beneath the table is a gripper adapted to hold one end of the twine carried by the wrapping arm, as the arm is rotated to lay the twine in a plane about the bundle with the wrap passing between the sections of the table. A pair of die members, one fixed and the other movable, are mounted beneath the table at one side of the plane of the twine wrap and the movable member can be moved to and from a position, in which it cooperates with the fixed member to define a throat receiving the ends of the wrapped twine and forming a die having a tangential entrance opening. A slug cut from the end of a flat metal strip is fed edgewise through the opening into the die and is formed into a clip tightly enclosing and clamping the ends of the wrap. After the ends of the twine are thus secured together by the clip, the gripper releases the twine at one side of the clip and closes upon the twine at the other side. The gripper is provided with cutting means and, when the gripper seizes the twine between the clip and the wrapping arm, the cutter severs the twine between the clip and the gripper, after which the gripper returns to its original position and the machine is ready for a new winding cycle.

For a better understanding of the invention, reference may be made to the accompanying drawings, in which

Fig. 18 is a view on the line 18—18 of Fig. 9;

The new bundle tying machine illustrated in the drawings is of movable type and it includes a platform 21 supported on casters 22 and carrying at one end a housing 23 containing most of the driving means for the operating parts of the machine. At the other end of the platform is mounted a standard generally designated 24, which includes a head 25 containing a bearing 26 for a hollow shaft 27. A sprocket wheel 29 has a hub 28 fast on shaft 27 and a hub 30 adjacent hub 28 and fast on the shaft carries a wrapping arm 31 of L-shape having a section 31a extending radially from the hub 30 and an end section 31b extending parallel to the axis of rotation of shaft 27. The hub 30 carries an extension 32, on which is pivotally mounted a tension arm 33 lying in the plane of rotation of section 31a of the wrapping arm and urged away from the wrapping arm by a spring 34.

The twine T is drawn from a supply and passes through the hollow shaft 27 to issue through a radial passage 35 between hubs 29, 30. The twine then passes through a guide eye 33a at the end of the tension arm, a guide eye 36 on the wrapping arm at the angle thereof, and a guide eye 37 at the free end of the wrapping arm.

An arm 38 of L-shape has one section 38a loosely supported by shaft 27 beyond hub 30 and extending radially from the shaft, while the second section 38b of arm 38 extends parallel to the axis of shaft 27 from the outer end of section 38a. The sections 38a, 38b of arm 38 are provided with face plates 39, 40, respectively, and plate 40 serves as the island section of the bundle table. The remainder of the table is a fixed section 41 on top of housing 23.

A standard 42 attached to the side of housing 23 extends upwardly above the top of the bundle table and is provided with a longitudinal guide plate 43. A carriage 44 is mounted movably on the standard and is provided with rollers 45 engaging opposite faces of the guide plate 43. The carriage has a lateral arm 46 provided at its lower end with a plate 47 which overlies the bundle table and is parallel thereto. The carriage is connected by a rod 48 to a piston within a cylinder 49 mounted on the side of housing 23 and having connections 50, 51 at its upper and lower ends, respectively, through which air under pressure may be admitted into the cylinder to raise and lower the piston and carriage 44. Downward movement of the carriage is utilized to cause plate 47 on the carriage to compress a bundle B resting on the bundle table. A carriage 52 is mounted movably on the fixed section 41 of the table and may be secured in different positions relative to the table. Carriage 52 is provided with vertical rods 53, against which the bundle B may be placed when it is to be compressed and bound.

Figure 2:
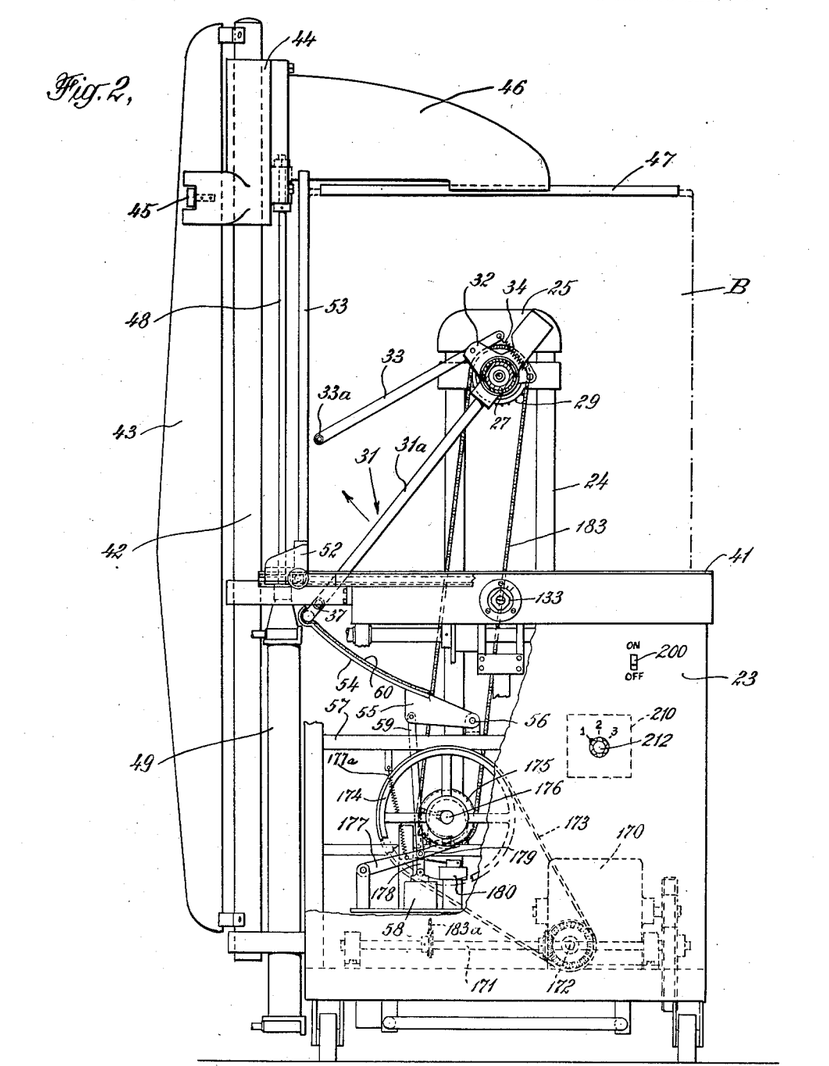
Fig. 2 is an elevational view of the machine with parts broken away.

In its idle position, the wrapping arm 31 lies, as shown in Fig. 2, with its end section 31b seated in a recess at the end of a stop plate 54 attached at its other end to a frame 55 pivoted at 56 on a part of the frame-work of the machine and capable of being swung on its pivot by a solenoid 58 having a plunger connected to the frame 55 by a rod 59. The plate 54 has a friction lining 60 on its upper face and is of such shape that, as the wrapping arm is rotated with shaft 27, the section 31b of the arm wipes along the friction surface before being seated in the recess at the end of the plate.

A combined scissors and gripping device, generally designated 61 (Figs. 3, 4, and 10), is mounted beneath the bundle table adjacent the plane of the wrap of twine laid about the bundle by the rotation of the wrapping arm 31. The device comprises a base or platform 62 secured to the upper end of a bar 63 mounted on the ends of cranks 64, 65 attached to pins 66, 67, respectively. The pins are supported in bearings 68 extending from the rear wall of a housing 69 and the pins extend through the housing with the cranks lying forward of the front wall thereof. Within the housing, each pin carries a pinion 70 engaged with a rack 71 lying within the housing and carried on an arm 72 attached to a rod 73. The rod is operable to raise and lower the rack by means of a lever 73a attached to the upper end of the rod and pivotally mounted on a fixed shaft 88 within housing 23. The lever has a roller entering a groove in the face of a cam 73b on the cam shaft 92 of the machine and is oscillated by the cam to raise and lower rod 73 and the rack 71. In the movement of the rack, the cranks 64, 65 are swung so that the bar 63 is caused to travel with a movement of translation along a circular arcuate path. The path has a length along an arc greater than 180° and its ends lie on opposite sides of the axis of the path, which is a line through the axes of pins 66, 67. In the machine illustrated, the path of translation of bar 63 passes throughout a 240° arc.

The base 62 of the scissor-gripper supports a fixed arm 74, the upper end of which is formed as the fixed jaw 74a of the gripper. One end of a straight link 75 is pivoted at 75a on the fixed arm 74 and the link is pivotally connected at its other end to a bell crank 76 at the angle thereof. The bell crank has an operating arm 76a provided with a roller engageable with a stationary post 77 rising from the base 62 and the other arm 76b of the bell crank is pivotally attached to the lower end of a link 78, which has an extension adjacent its upper end pivoted at 78a to the fixed arm 74. An L-shaped link 79 is pivotally mounted at 80 on the link 78 and the upper end of link 79 is formed as the movable jaw 79a of the gripper. A spring 81 is attached to arm 76a of bell crank 76 and to the tail of link 79 and a pin 82 on link 79 is engageable with a stop pin 83 on link 78. The fixed blade 84 (Fig. 18) of a pair of scissors is mounted on the fixed arm 74 adjacent the gripper jaw 74a and the cooperating moving blade 85 of the scissors is mounted on a spacer 86 secured to link 78 and lies adjacent the movable gripper jaw 79a.

Figures 3, 4, 13:
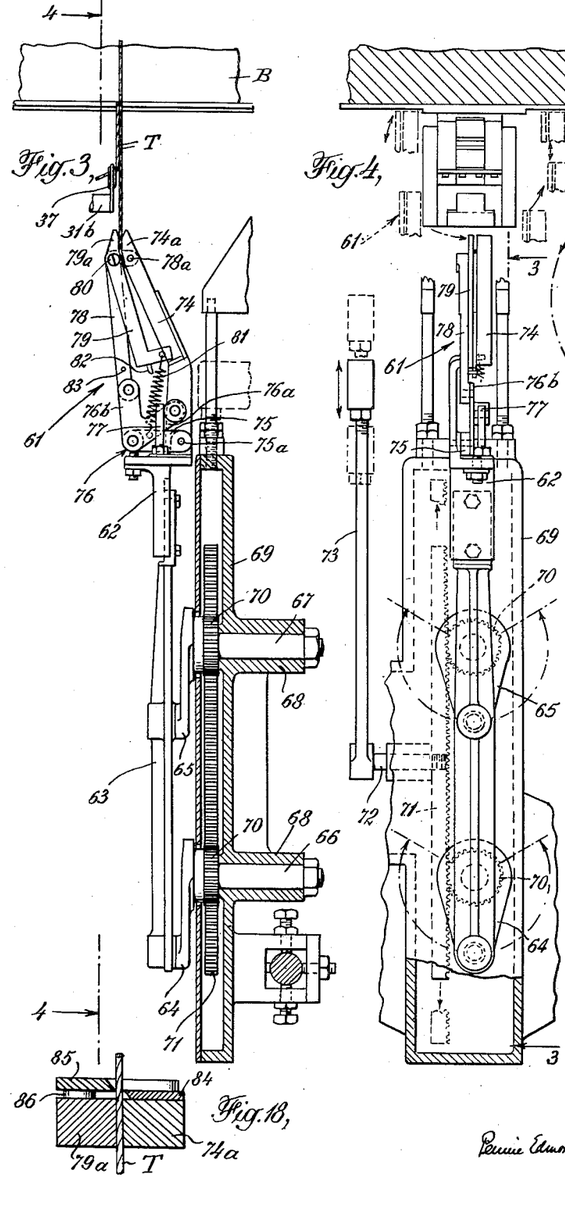
Fig. 3 is a vertical sectional view of the gripper actuating mechanism on the line 3—3 of Fig. 4.
Fig. 4 is an elevational view of the mechanism shown in Fig. 3 with parts broken away.
Fig. 13 is a sectional view on the line 13—13 of Fig. 11.

In the operation of the machine, when the scissor-gripper lies at the end of its arcuate path, which is to the left of the axis of the path, as shown in Fig. 4, the device is actuated to open the gripper jaws and scissor blades. When the device has been moved to the other end of its arcuate path to the right of the axis of the path, the device is actuated to close the jaws and the blades.

Figure 10:
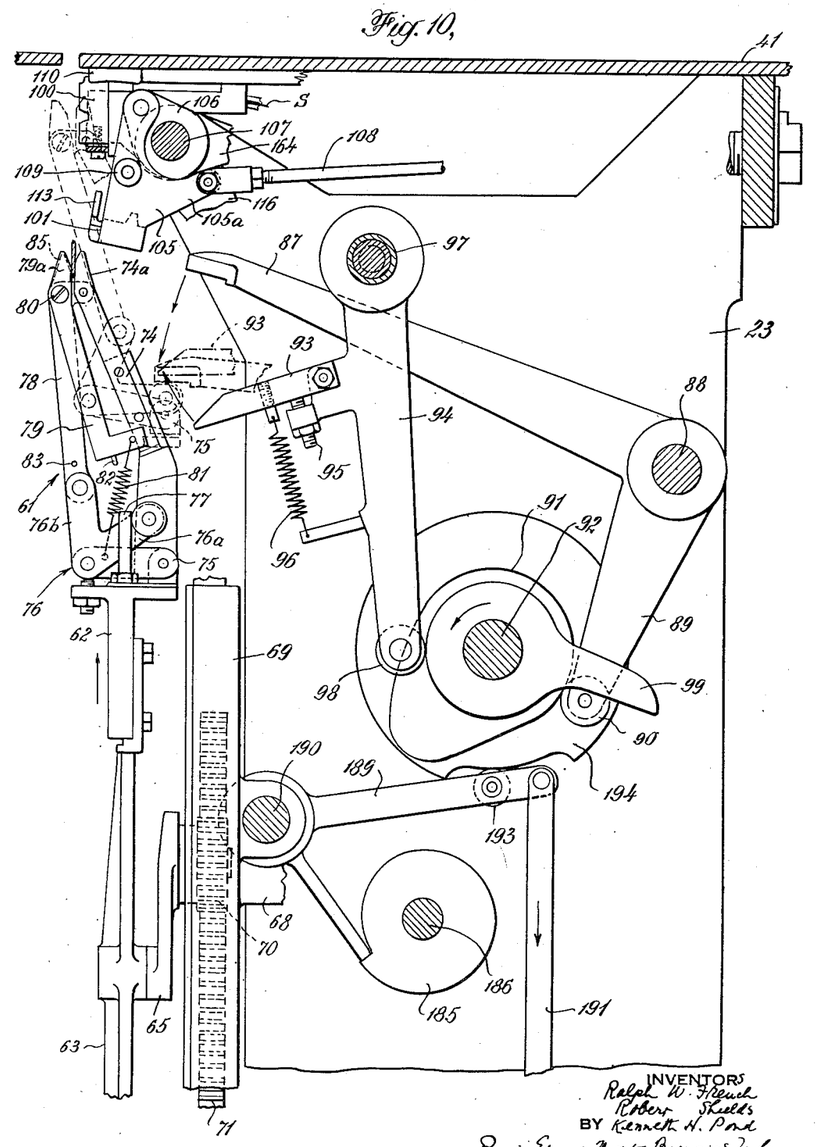
Fig. 10 is a vertical sectional view, showing the operation of the gripper.

The actuation of the scissor-gripper mechanism to open the gripper jaws and scissor blades is effected by means of the arm 87 (Fig. 10) of a bell crank pivotally mounted on shaft 88 and having an arm 89 provided with a roller 90 engaging a cam 91 on the cam shaft 92. When the scissor-gripper is to be opened, cam 91 acts to swing the bell crank counter-clockwise, as seen in Fig. 10, and the end of arm 87 strikes the roller on the end of arm 76a of bell crank 76 and swings the bell crank 76 clockwise, as seen in Figs. 3 and 10. When the bell crank 76 is thus moved, its pivotal connection to link 75 moves upward with link 75 swinging clockwise. The movement of arm 76b of the bell crank 76 causes link 78 to swing and thereby separate the movable scissor blade 85 from the fixed blade 84. Shortly thereafter, the pin 83 on link 78 engages the pin 82 on link 79 and swings link 79 to move the movable gripper jaw 79a away from the fixed jaw 74a.

After the scissor-gripper device has been opened, as above described, it is held in open condition by spring 81 until it is closed by means of an arm 93. The arm is pivotally mounted on an arm 94 and is held against a stop screw 95 on arm 94 by means of a spring 96. Arm 94 is pivoted on a fixed pivot 97 within housing 23 and has a cam follower roller 98 engaging a cam 99 on cam shaft 92. When the open scissor-gripper device is to be closed, arm 94 is swung by cam 99 to cause arm 93 to engage the roller on arm 76a of bell crank 76 from beneath and swing the bell crank counter-clockwise, as seen in Fig. 3. At the same time, link 75 moves counter-clockwise with the result that the gripper jaws 74a, 79a close and, shortly thereafter, the movable shear blade 85 coacts with the fixed blade 84 to effect a cutting action.

When the wrapping arm has laid the desired number of turns of twine about a bundle to form the wrap, the ends of the twine wrap are secured together by means of a metal clip, which tightly encloses the twine ends. The clip is made from a blank or slug cut from a strip and formed into the clip in a die made up of a fixed die member 100 and a movable die member 101 (Figs. 11-17, incl.).

The fixed die member 100 is mounted on brackets 102 secured by screws to the under surface of a removable plate 103 forming part of the top of the fixed section 41 of the bundle table. The brackets are connected by a plate 104 secured to the under surface thereof by screws and the die member 100 is supported adjustably on screws threaded through plate 104.

The movable die member 101 is mounted between a pair of plates 105, which are pivoted on arms 106 fast on a shaft 107, and one of the plates has an extension 105a, to which is connected a rod 108 operated by a cam lever 108a pivotally mounted on shaft 88 and having a roller engaging a cam 108b on cam shaft 92. The plate with the extension also carries on its outer surface a roller 109 which bears against the under cam surface of a block 110 attached to the under side of plate 103. The movable die member 101 has an arcuate channel 111 in its face at its upper end and the fixed die member 100 has a similar channel 112. When the die members are in contact, the channels cooperate to define a throat, in which the twine ends of a wrap about a bundle are received and the clip for connecting the ends together is formed. The movable die member has a tongue 113, which overhangs the channel 111 and may move over the top of the fixed die member 100 in spaced relation thereto. When the members are closed, the under surface of the tongue and the top of the fixed die member define an entrance opening 114 leading tangentially into the throat. The movable die member has a transverse rib 115, which enters a corresponding recess in the face of the fixed die member when the die members are in contact.

Figure 9:
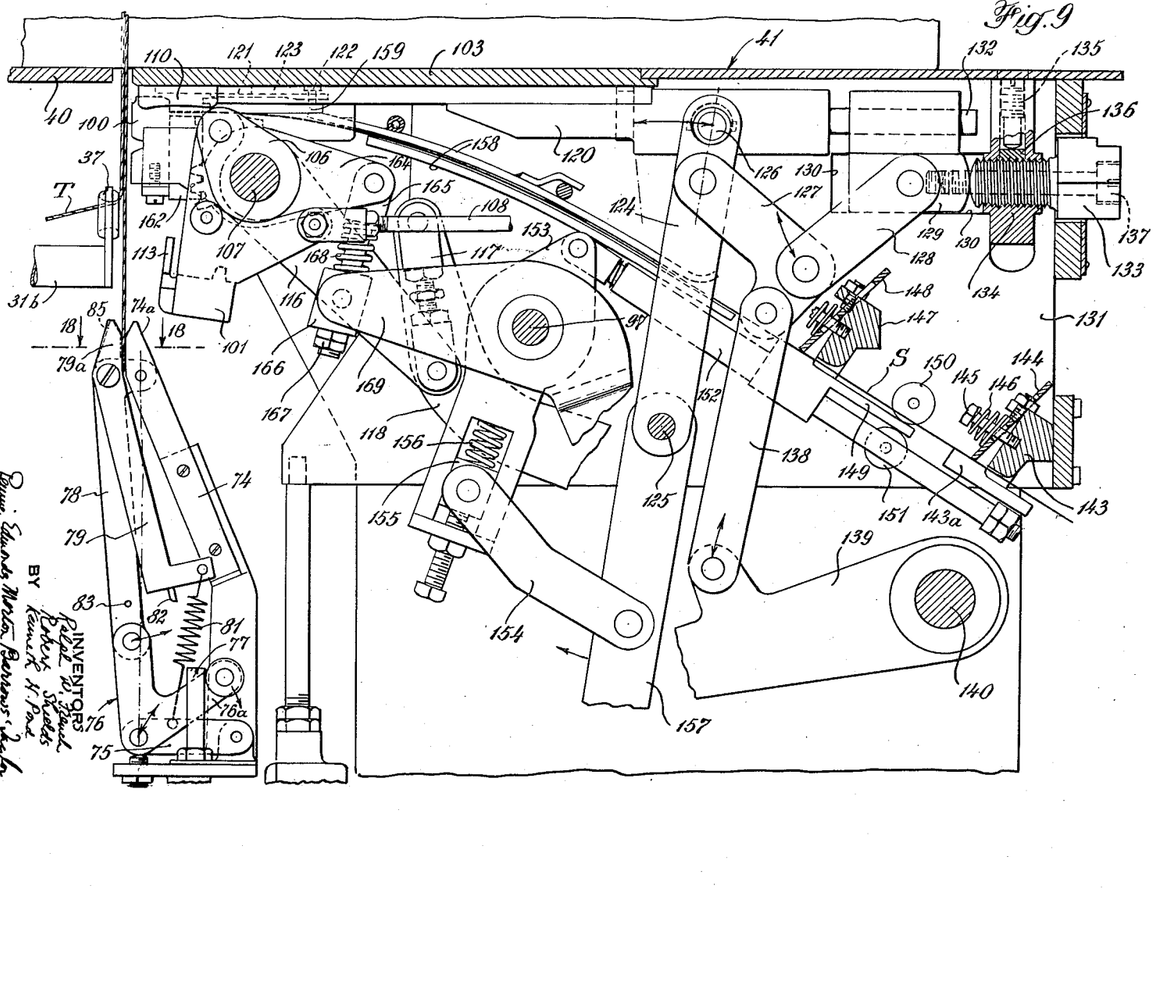
Fig. 9 is a vertical sectional view, showing the mechanism for applying clips to twine wraps.
Figures 11, 12, 13, 14, 15, 16, 17, 19, 20:
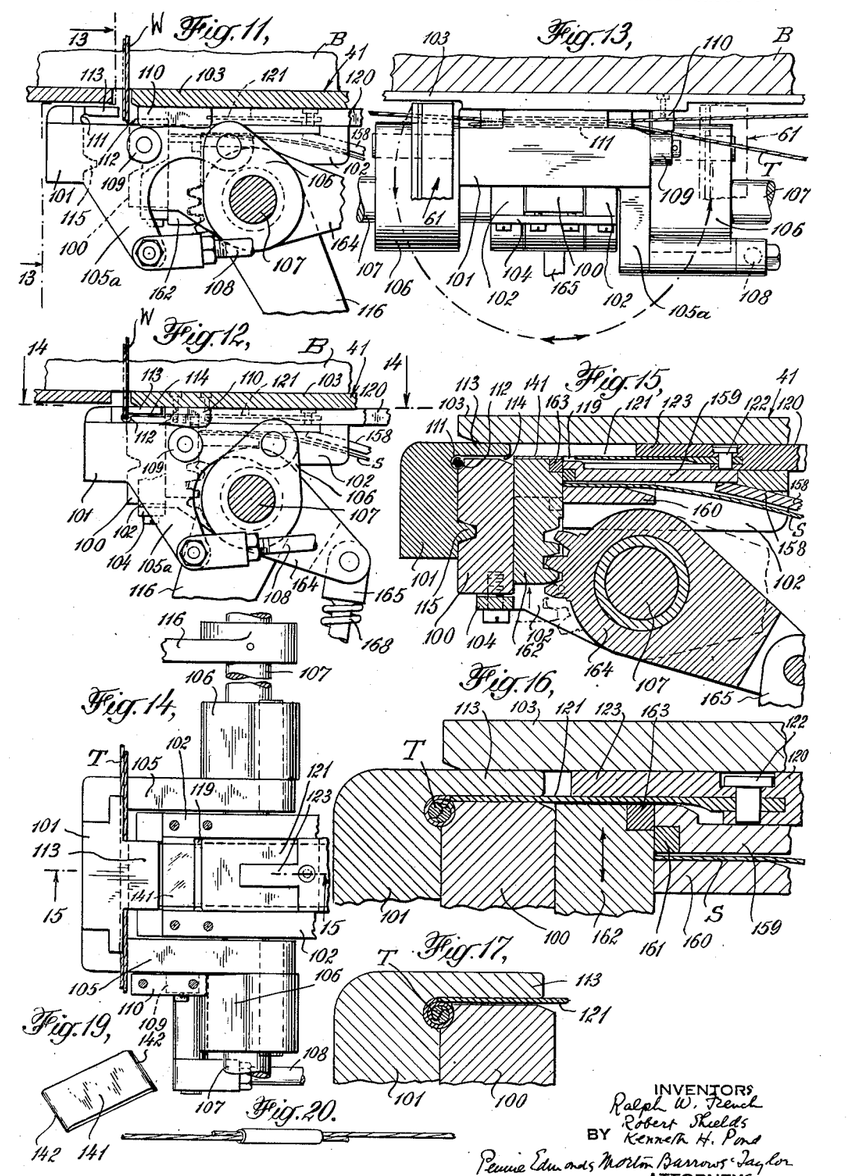
Figs. 11 and 12 are vertical sectional views showing the operation of the die members.
Fig. 14 is a sectional view on the line 14—14 of Fig. 12.
Fig. 15 is a sectional view on the line 15—15 of Fig. 14.
Fig. 16 is a sectional view similar to Fig. 15, but on a larger scale.
Fig. 17 is a fragmentary view similar to Fig. 16, but showing the formation of a clip on smaller twine.
Fig. 19 is a perspective view of a slug to be formed into a clip.
Fig. 20 is an elevational view of a clip applied to the ends of a twine wrap.

When the die members are out of action, the movable die member depends from its pivotal connections to arms 106 on shaft 107, as shown in Fig. 9, and lies at the same side as the plane of the twine wrap as the fixed die member 100 and thus outside the space defined by the surface of revolution described by the wrapping arm 31 in its rotation. When the die members are to cooperate to form a throat, in which a clip is formed about the twine ends of a wrap, the side plates 105 carrying the movable die member are swung relative to arms 106 in a clockwise direction, as seen in Fig. 9, and this movement of the die member is effected by the operation of rod 108 by its cam 108b. When the movable die member has been moved up, so that arms 105 extend horizontally, as shown in Fig. 11, roller 109 engages the under surface of the cam block 110 and, with the parts in this position, shaft 107 is rocked clockwise (Fig. 11), so that its arms 106 move the movable die member toward the fixed die member. In this movement, the contact of roller 109 with the cam surface of block 110 causes the movable die member to advance along a substantially rectilinear path, until the rib 115 on the movable die member enters the corresponding channel on the fixed die member. The rocking movement of shaft 107 is accomplished by means of an arm 116 (Fig. 9) fast on the shaft and connected by a link 117 to a lever 118 pivotally mounted on shaft 88 and having a roller entering a cam groove in the face of a cam 118a on cam shaft 92.

The brackets 102 have guide channels 119 along their inner upper edges and a slide 120 is mounted between the brackets and is movable in the channels. A punch or plunger 121 is secured by a pin 122 in a recess in the forward edge of the slide and projects in front of the slide, the slide having an overhanging portion 123 to reinforce the punch. The punch, when advanced by the slide, enters the entrance opening 114 into the throat formed by the die members and the movement of the slide for this purpose is effected by a link 124 (Fig. 9) mounted for oscillation on a fixed pivot 125 attached to a frame member of the machine. The link has a pin 126 at its free end, which is loosely received in an opening in the slide and the link is pivotally connected to one arm of a bell crank 127, which is pivoted at its angle to a link 128 and with the latter forms a toggle. Link 128 is pivotally mounted on a block 129, which has lateral extensions in guide slots 130 in suitable frame members, of which only member 131 is shown. The block has an opening, through which a rod 132 projecting rearwardly from slide 120 extends, the engagement of the rod in the opening of the block serving to keep the block and slide aligned. The position of the block 129 is adjustable by means of a screw 133, which passes through a threaded opening in a plate 134 mounted between the frame members previously mentioned. The end of screw 133 abuts the end of block 129 and, after the screw has been turned to the desired position, it is held against movement by a setscrew 135, which is threaded into an opening in the plate 134 and forces a threaded plate 136 tightly against screw 133. The screw 133 has an unthreaded bore extending through it and a locking screw 137 extends through the bore and is threaded into an opening in the end of block 129. By turning screw 137, the block may be held tightly against the end of screw 133.

The slide 120 is moved back and forth by the making and breaking of the toggle formed by the long arm of bell crank 127 and the link 128. The bell crank is swung for the purpose by means of a link 138 attached to a lever 139 mounted to swing on the shaft 88 and having a roller entering a groove in the face of a cam 140 on cam shaft 92.

The strip S, from which the slugs 141 (Fig. 19) are cut, has a width equal to the length of the clips to be formed therefrom and its side edges taper in thickness, as indicated at 142. When a slug cut from the strip is formed into a clip, the entrance opening into the clip at each end is slightly bell-mouthed. This prevents the twine from being cut by the clip.

The strip S is drawn from a supply (not shown) and is advanced step-wise. For this purpose, the strip is passed through an opening in a block 143 (Fig. 9) attached to a part of the frame and having an extension 143a, over which the strip travels. A plate 144 is mounted loosely on a bolt 145 extending through an opening in the plate and entering the block and a spring 146 engages the head of the bolt and the plate. When the strip is threaded through the opening and beneath the plate, the plate is held by the spring at such an angle that the lower edge of the plate engages the strip and permits the strip to be moved in one direction beneath the plate, but prevents its return movement.

The strip is fed step-wise by a feeding device, which comprises a block 147 with a spring-pressed plate 148, the block and plate being similar in construction and operation to block 143 and plate 144. Block 147 has an extension 149 lying between guide rollers 150, 151 and is connected by a rod 152 to one end of a lever 153 mounted for free oscillation on shaft 97. The lever is rocked on the shaft by a link 154 having one end connected to a block 155 lying in a slot in lever 153 and engageable with a spring 156 at one end of the slot. The other end of link 154 is connected to a lever 157 pivoted at one end on the fixed pivot 125 and carrying at its other end a cam follower roller entering a groove in the face of cam 157a on cam shaft 92.

The strip advanced step-wise by the reciprocation of block 147 passes between upper and lower fixed guides 158 and beneath a removable plate 159 (Figs. 15, 16) which is supported between the brackets 102 and lies above and in spaced relation to a fixed plate 160 similarly mounted. The plate 159 lies beneath the punch 121 when the latter is in retracted position and the end of plate 159 toward the fixed die member 100 is formed with a seat, in which is mounted a shear bar 161. A slide 162 is mounted for vertical movement between the brackets 102 and the face of the fixed die member and the end of the stationary plate 160, and the slide is provided at its upper end with a seat containing a shear bar 163 cooperating with bar 161. The slide 162 is formed with rack teeth engaging similar teeth on an arm 164 mounted loosely on a sleeve encircling the shaft 107. A link 165 (Fig. 9) is connected to the end of the arm remote from the teeth and the link is encircled by a sleeve 166 movable along the link and held in contact with a nut 167 at the end of the link by a spring 168 encircling the link. The sleeve is pivotally connected to one end of an arm 169 pivotally mounted on shaft 97 and carrying a cam follower roller entering the groove on the face of cam 157a.

Figure 1:
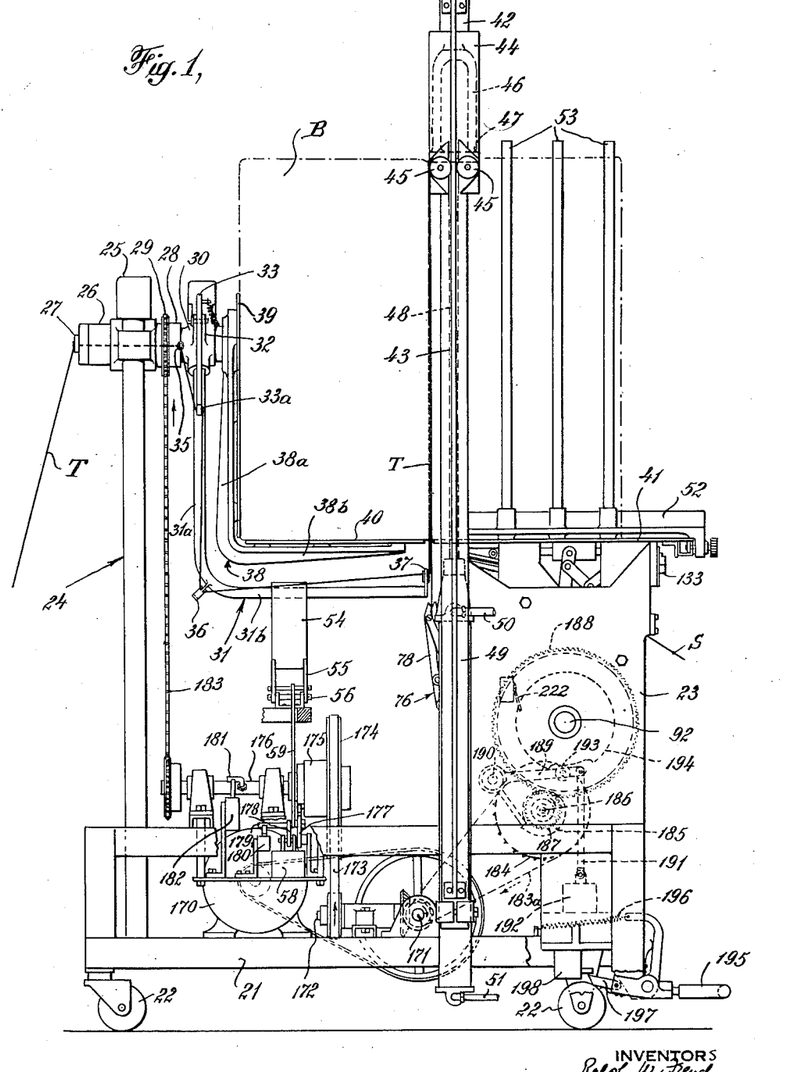
Fig. 1 is a view of the new machine in side elevation with parts broken away.

The machine is operated by a motor 170 (Fig. 2) connected by a belt to a main drive shaft 171 (Fig. 1) connected through bevel gearing to a counter-shaft 172. The motor 170 is controlled by a combined on-off switch and circuit breaker 200 shown in Fig. 2 and, diagrammatically, in Fig. 27. The countershaft is connected by a belt 173 to a pulley 174, which is in turn connected by a clutch 175 to a shaft 176. The clutch has an operating arm 177 operable by a link 178 connected to the plunger of the solenoid 58, which is connected by a link 59 to the frame 55 of the winding arm stop plate 54. The link 59 is provided with an arm 179 operating a switch 180 and shaft 176 has an arm 181 operating a switch 182. Shaft 176 has a sprocket wheel connected by the chain 183 to the sprocket wheel 29 and thus drives the shaft 27, on which the winding arm is mounted.

The main drive shaft 171 (Fig. 1) is connected by a chain 183a, indicated diagrammatically, to a sprocket wheel 184 connected through a clutch 185 to a shaft 186, which is in turn connected through a pinion 187 and a gear 188 to the cam shaft 92. The clutch 185 is of the one-revolution type and it is operated by a bell crank 189 pivoted on a frame member at 190 and connected by a link 191 to the plunger of a solenoid 192. The bell crank 189 also carries a roller 193 engageable with a cam 194 on the cam shaft 92. A foot treadle 195 is pivotally mounted on the machine and held in position by a spring 196. The treadle carries a projection 197, which, upon depression of the treadle, closes switch 198, which closes a circuit to cause an adjustable timer (generally indicated at 210 in Fig. 2) to start operating. The electric circuit of a suitable timer is shown in diagrammatic form in Fig. 27. By means of a multi-position switch 212 (Fig. 2), the length of the timer cycle can be set to any one of a plurality of values, to which correspond different numbers of wraps of twine laid by the machine about the bundle to be wrapped.

To prepare the machine for use, the twine T from the supply is threaded through the hollow shaft 27, brought out through the radial passage 35, and then led through the guide eye 33a on the tension arm 33 and the guide eyes 36 and 37 on the winding arm 31. The end of the twine is then placed between the jaws of the scissor-gripper 61 which, at the time, lies at the top of its path of travel at the left side (Fig. 4) of a line drawn through the axis of pins 66, 67. By means of switch 200, the operator then starts motor 170, which runs continuously, so that the main shaft 171 and the cross-shaft 172 are continuously driven. When a bundle B is to be tied, the operator places it on the table made up of the island and fixed sections 40, 41 with one side of the bundle in contact with the rods 53 and another side in contact with the face plate 39 on the arm 38 supporting the island section of the table. The operator then admits air into the cylinder 49 to lower the arm 46, so that the plate 47 thereon engages the top of the bundle and compresses it.

To tie the compressed bundle, the operator depresses the foot treadle 195 and thereby trips the switch 193 to start the timer. The timer is of conventional construction and its function is to cause solenoid 58 to be energized for periods varying in length, according to the setting of the timer. When the solenoid is energized, it pulls down link 178 to move arm 177, so that clutch 175 is thrown in and shaft 176 is connected to shaft 172. The energization of solenoid 58 also causes link 59 to be drawn down, so that the winding arm stop plate 54 moves clear of the arm. The rotation of the shaft 176 causes the winding arm to be rotated to carry a wrap of twine about the bundle and the rotation of the winding arm continues so long as solenoid 58 is energized. The length of the period, through which the solenoid 58 is energized, determines the number of wraps of twine, which will be laid about a bundle, and the timer can be adjusted for the desired number of wraps.

When the timer deenergizes the solenoid 58, arm 177 is raised by spring 177a to throw out clutch 175 and disconnect shaft 176 from shaft 172. Also, the raising of arm 177 causes the winding arm stop plate 54 to be moved up to its initial position. As the winding arm continues to rotate by its momentum, section 31b on the arm comes into contact with the friction facing 60 on the stop plate and the arm is slowed down, until section 31b comes to rest in the seat at the end of the stop plate. The deenergization of solenoid 58 also causes switch 180 to be closed. This switch is in circuit with switch 182 actuated by arm 181 on shaft 176 and, when both switches are closed at the same time, the solenoid 192 is momentarily energized and swings arm 189 to throw in the one-revolution clutch 185. The rotation of shaft 186 causes the cam shaft 92 to be rotated until shaft 92 has made a complete revolution and cam 194 thereon has swung bell crank 189 to disengage clutch 185. During such a revolution of the cam shaft, the following actions take place.

The movable die member 101 is swung from the position, in which it is shown in Fig. 10, to the position, in which it is shown in Fig. 11. The movement is effected by rod 108 pushing on the extension 105a on one of the plates 105 to cause the plates to be rocked on their pivots on arms 106. The cam-operated arm 118 then rocks arm 116 fast on shaft 107, so that the movable die member 101 is moved into contact with the fixed die member 100 with the ends of the twine wrap W lying in the throat formed by the channels 111, 112 in the die members. The scissor-gripper 61 is now moved from the top of its path at the left (Fig. 4) to a position, in which the cranks 64, 65 extend horizontally. This causes the scissor-gripper to move laterally a short distance from its initial position and, in such movement, the device draws the twine more tightly about the bundle.

During the previous cycle of operation of the machine, a slug 141 has been sheared from the free end of the strip S by the rising of slide 162 and the slug lies on top of the slide in front of punch 121. When the twine has been drawn tightly about the bundle by the movement of the scissor-gripper, the punch advances to engage the rear edge of the slug and push the slug through opening 114 into the throat formed by the channels 111, 112 of the die members, after which the punch is retracted. In the movement of the slug, its forward end engages the curved surface of channel 111 and the slug is wrapped around the ends of the twine T, as shown in Fig. 16, to form a clip holding the twine ends tightly. While the clip is being formed, the slide 162 is moved downwardly and, when it reaches the bottom of its stroke, the strip feeding block 147 advances the strip S to place its end section on top of slide 162 and the slide then rises to sever another slug 141 from the end of the strip. As slide 162 rises, the feed block 147 is retracted to grip the strip S for the next advance thereof.

As soon as the clip has been applied to secure the ends of the twine in the wrap, the jaws and blades of the scissor-gripper device are opened by the action of arm 87 and the scissor-gripper is carried by cranks 64, 65 to the other end of its path of travel, so that it lies on the side of the die members opposite that where it was positioned during the wrapping operation. As the open scissor-gripper approaches the end of its path, the length of twine between the clip and the guide eye 37 at the end of the winding arm 31 enters between the blades and jaws of the scissor-gripper. When the device has come to rest at the end of its path of travel, the arm 93 is actuated to cause the jaws to clamp the twine, after which the blades cut the twine between the clip and the place, where the twine has been seized by the scissor-gripper jaws. The scissor-gripper is then moved back to the opposite end of its path. The sequence of operations is now completed and the one-revolution clutch 185 is thrown out, so that the cam shaft 92 comes to rest.

The number of wraps of twine laid about a bundle by the rotation of the winding arm 31 depends upon the setting of the timer. During the wrapping of the twine about a bundle, shaft 176 is continuously rotated to drive the winding arm, and the switch 182 is closed by arm 181, once for each rotation of the shaft. However, since switches 180 and 182 are in series, the closing of switch 182 results in the energization of the solenoid 192 only when switch 180 is closed. Switch 180 remains open so long as the solenoid 58 is energized and the duration of the period of energization of the solenoid is determined by the setting of the timer. Although more than one wrap of twine may be laid about a bundle, only the ends of the wrap are secured together by a clip. One of the ends extends from the scissor-gripper to the bundle and the other extends from the bundle to the guide eye at the end of the winding arm.

Figure 5:
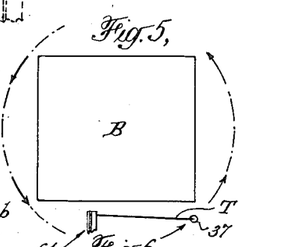
Figs. 5–8, incl., are diagrammatic views showing the operation of the winding arm and gripper in tying a bundle.
Figure 6:
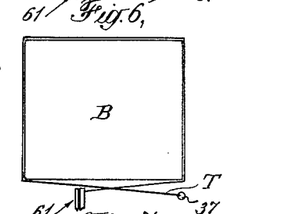
Figure 7:
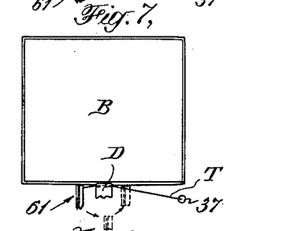
Figure 8:
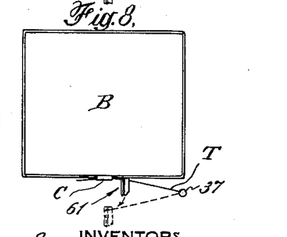

The operation of the machine is diagrammatically illustrated in Figs. 5–8, incl., and, in Fig. 5, the twine T is shown as being held at one end by scissor-gripper 61 and passing through the eye 37 on the winding arm. In the wrapping operation, the winding arm travels through 360° in the direction indicated by the arrows and comes to rest as illustrated in Fig. 6. At this stage, the ends of the twine wrap extending, respectively, from the scissor-gripper to one bottom corner of the bundle and from the opposite bottom corner to the guide eye 37 cross each other at a point lying in line with the die members indicated at D, Fig. 7. When the movable die member is swung and then moved into contact with the fixed die member, the crossed portions of the twine lie within the throat between the die members and the clip C is applied. As soon as the crossed ends of the twine have been secured by the clip, the scissor-gripper 61 is opened and travels along the path indicated in Fig. 7, until it reaches the position shown in Fig. 8. In this position of the scissor-gripper, the end of the twine between the clip C and the guide eye 37 on the winding arm lies between the jaws and blades of the scissor-gripper and, when that device is actuated, the jaws close upon the twine, after which the twine is cut close to the clip. The scissor-gripper then moves back to its original position, as shown in Fig. 5, and the apparatus is ready for the next tying operation.

Figure 27:
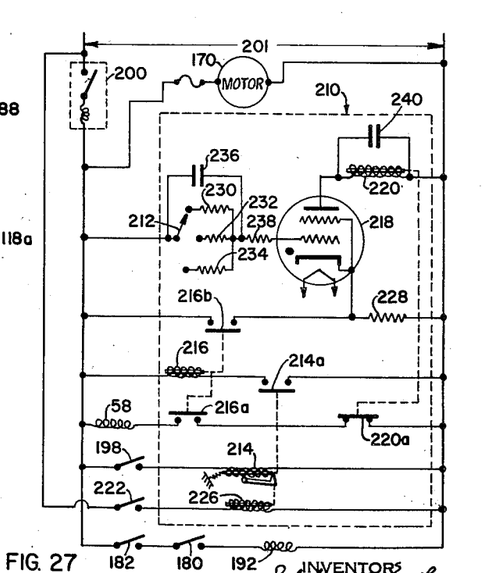
Fig. 27 is a diagram of the electrical control circuit of the machine.

While the essential features of the machine and its mode of operation have been fully described, there will now be given with reference to Fig. 27 a description of one form of electrical control including the switches 180, 182, and 200, the solenoids 58 and 192, and the timer 210. In Fig. 27, a source of electric power, such as an ordinary 110 volt alternating current lighting circuit, is indicated at 201. Switch 200 controls the application of voltage from this line to the driving motor 170. Switch 198, momentarily closed by the operator when he depresses foot treadle 195, controls the application of power to a relay 214 which may functionally be considered as part of the timer and which is, therefore, shown within a dash-line box 210 enclosing the components of the timer. Energization of relay 214 closes a pair of normally open contacts 214a of that relay which, with the coil of a second relay 216, form a series circuit across the line 201. Energization of relay 214, accordingly, results in energization of the relay 216. Relay 214 is of the latch type, so that its armature is retained mechanically in the position which it assumes when the relay is energized, even after energization ceases.

Relay 216 has two pairs of normally open contacts. One pair 216a is in series with the winding of solenoid 58 and also in series with a pair of normally closed contacts 220a of relay 220. Contacts 216a and 220a and solenoid 58 are in series across the line, so that, with relay 220 de-energized (as it is at the beginning of a wrapping cycle), energization of relay 216 results in energization of the solenoid 58. Thus, the depression of the foot treadle 195 causes solenoid 58 to be energized and this effects engagement of clutch 175, so that the wrapping operation proper is begun.

The second pair of contacts 216b on relay 216 are connected in series with the plate-cathode conduction path of a gas tetrode 218 and with relay 220 across line 201. Tube 218, together with a resistance capacitance combination in its control grid circuit, provides a timing device or timer proper which interposes a delay, selectable at switch 212, between the closing of contacts 216b and the energization of relay 220. Timing devices of this kind are described in Patent 2,296,580.

The cathode of tube 218 is connected through a resistor 228 of comparatively low value to the side of line 201 opposite that to which the tube grid is connected through switch 212 and any one of a number of resistors 230, 232, and 234 selected thereby. Resistors 230, 232, and 234 are of different values, but are all preferably large compared to resistor 228. A capacitor 236 is connected in shunt with the switch 212 and resistors 230, 232, and 234.

When contacts 216b are open, i. e. before operation of the foot treadle, the grid-cathode path in tube 218 forms a rectifier which rapidly charges capacitor 236 through a resistor 228 and, if provided, a current limiting resistor 238. The charge which accumulates on capacitor 236 is such as to bias the tube grid negatively with respect to the side of the line to which the cathode is connected when contacts 216b close. When these contacts do close, the line voltage is thrown across the plate-cathode path of the tube and the tube grid is returned to the cathode through capacitor 236. With the grid thus negatively biased, capacitor 236 thereupon discharges at a rate determined by the value of the resistance across it. The setting of switch 212, therefore, controls the time interval before which the tube will fire. When the tube fires, the grid loses control, and the tube conducts on alternating half cycles so as to energize relay 220, which is shunted by a suitable capacitor 240.

When relay 220 is energized, its normally closed contacts 220a are opened and this de-energizes solenoid 58, so that clutch 175 is disengaged and switch 180 (Fig. 1) is closed. Shaft 176, however, continues to turn under the momentum of its previously established velocity, and switch 182 is closed momentarily by action of pin 181 (Fig. 1) as shaft 176 thus rotates. At this closing of switch 182, solenoid 192 is momentarily energized and this effects engagement of clutch 185 to initiate operation of the twine fastening and cutting mechanism.

Figure 21:
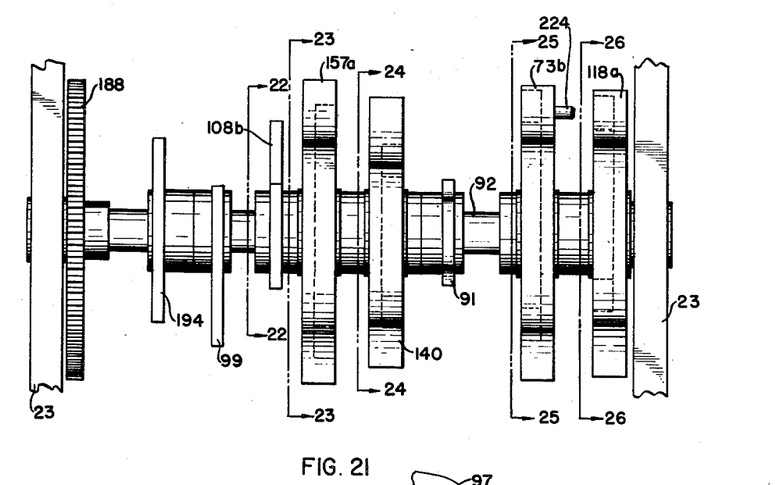
Fig. 21 is a view in side elevation of the cam shaft of the machine with the cams thereon.
Figure 22:
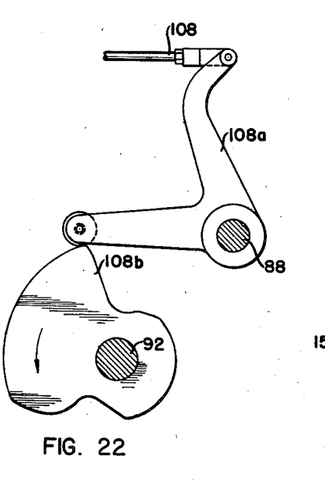
Figs. 22–26, incl., are sectional views on the lines 22—22, 23—23, 24—24, 25—25, and 26—26, respectively, of Fig. 21 with parts operated by the cams added.
Figure 23:
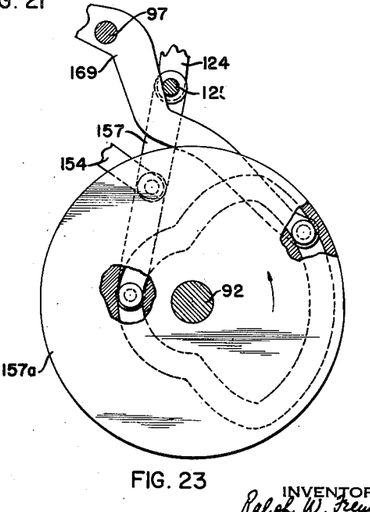
Figure 24:
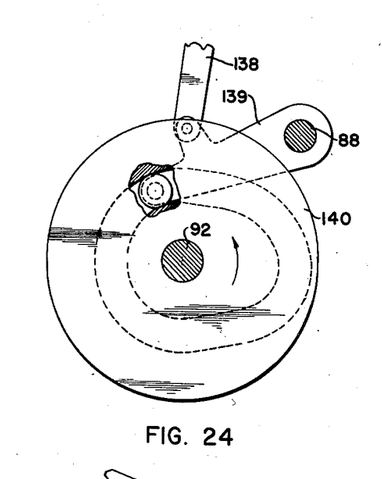
Figure 25:
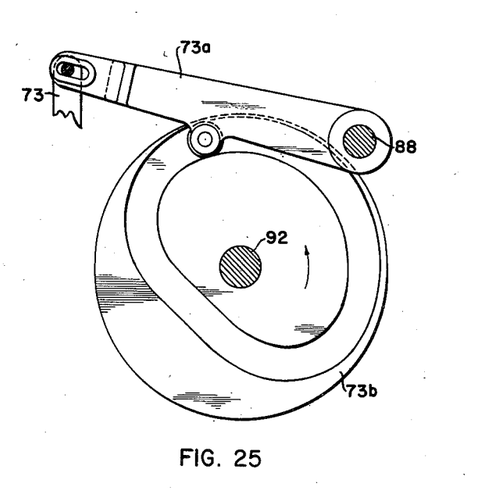
Figure 26:
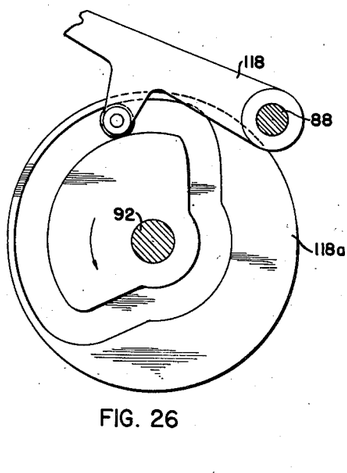

In the course of each revolution of cam shaft 92, a pin 224 on cam 73b (Fig. 21) momentarily closes a suitably mounted reset switch 222 (Figs. 1 and 27) to energize briefly a reset coil 226 associated with relay 214. The latch holding relay 214 is thereby disengaged, and relay 214 is allowed to return to de-energized position, in consequence de-energizing relay 216. The electrical circuit is thus made ready for tying of the next bundle.

Twine of different sizes may be employed in the machine and, in order that a clip C may tightly secure the ends of a wrap of twine of a given size, adjustment of the stroke of slide 120 and punch 121 may be necessary. In Fig. 16, there is shown a clip formed about the ends of a wrap of twine of relatively large size and, in folding the slug to form such a clip, the stroke of slide 120 and of the punch 121 is relatively short, so that the end of the punch does not enter the throat formed by the channels 111, 112 in the two die members. In Fig. 17, there is shown a clip holding the ends of a wrap of twine of smaller size and, in order to form such a clip, it is necessary that the punch 121 have a longer stroke and enter the throat formed by the die members. The variation in the stroke of slide 120 and punch 121 is effected by changing the position of block 129 by means of the adjustment screw 133 (Fig. 9) and, as the block is moved toward the adjacent end of slide 120, the stroke of the slide and of punch 121 are correspondingly shifted toward the die members.

In the new machine, the mounting of the swinging die member at the same side of the plane of the twine wrap as the fixed die member makes it possible to employ a winding arm, since the arm is free to be rotated about a bundle without interference from the support for the swinging die member. The use of the winding arm is desirable, because, with the arm, a wrap of twine about a bundle may include a plurality of turns, whereas, if the twine were laid about the bundle by a winding ring, it would not be possible to include more than one turn per wrap, unless the twine supply package was mounted on the ring. If the supply package was large, a winding ring capable of carrying such a package would be large and heavy, while, if the package was small, it would run out quickly and have to be replaced frequently. With the machine of the invention, a wrap of twine about a bundle may include as many turns of twine, as desired, and the number of turns is quickly changed merely by adjustment of the timer.

We claim:

1. In a bundle tying machine having a table for supporting a bundle, the combination of an arm mounted at one side of the table and rotatable through arcs of multiples of 360° in a single tying operation of the machine to lay a wrap of twine substantially in a plane around a bundle on the table, means for rotating the arm, a gripper for holding the end of the twine, a pair of die members mounted at the side of the wrapping plane remote from the arm mounting and separable to receive between them the end portions of a twine wrap held by the gripper and the arm, respectively, the die members being closable to form a throat containing the end portions of said wrap, the arm and the gripper initially lying at opposite sides of the die members, means for forcing a blank edgewise into the throat to form a clip tightly enclosing the end portions of the twine wrap, means for opening the gripper, means for actuating the open gripper to cause it to move past the clip and grip the twine between the clip and the arm, means for severing the twine between the clip and the closed gripper, and means for returning the closed gripper to its initial position.

2. In a bundle tying machine having a table for supporting a bundle, the combination of an arm mounted at one side of the table and rotatable through arcs of multiples of 360° in a single tying operation of the machine to lay a wrap of twine substantially in a plane around a bundle on the table, means for rotating the arm, a gripper for holding the end of the twine, a pair of die members mounted at the side of the wrapping plane remote from the arm mounting, one of the die members being stationary and the other being movable between a position, in which the members are spaced to receive between them the end portions of a twine wrap held by the gripper and the arm, respectively, and a position, in which the die members form a throat containing the portions of said wrap, the arm and the gripper initially lying at opposite sides of the die members, means for forcing a blank edgewise into the throat to form a clip tightly enclosing the end portions of the twine wrap, means for opening the gripper, means for actuating the open gripper to cause it to move past the clip and grip the twine between the clip and the arm, means for severing the twine between the clip and the closed gripper, and means for returning the closed gripper to its initial position.

3. In a bundle tying machine having a table for supporting a bundle, the combination of an arm mounted at one side of the table and rotatable through arcs of multiples of 360° in a single tying operation of the machine to lay a wrap of twine substantially in a plane around a bundle on the table, means for rotating the arm, a gripper for holding the end of the twine, a pair of die members mounted at the side of the wrapping plane remote from the arm mounting and separable to receive between them the end portions of a twine wrap held by the gripper and the arm, respectively, the die members being closable to form a throat containing the end portions of said wrap, the arm and the gripper initially lying at opposite sides of the die members, means for forcing a blank edgewise into the throat to form a clip tightly enclosing the end portions of the twine wrap, means for opening the gripper, means moving the open gripper with a movement of translation past the clip to a position in which the gripper has received the twine between the clip and the arm, means for closing the gripper on the twine, means for severing the twine between the clip and the closed gripper, and means for translating the closed gripper to its initial position.

4. In a bundle tying machine having a table for supporting a bundle and a gripper for holding one end of a length of twine, the combination of an arm engaging the twine between the gripper and a twine supply and rotatable through arcs of multiples of 360° in a single tying operation of the machine to lay a wrap of twine in a plane around a bundle on the table, a mounting at one end of the table supporting the arm for rotation on an axis through the portion of the arm in the mounting, the arm having a section extending along the side of the table and describing a surface of revolution upon rotation of the arm, a pair of die members, one fixed and one movable, mounted outside the space defined by said surface of revolution, said movable die member being movable between a position, in which the members are spaced to receive between them the end portions of a twine wrap held by the gripper and the arm, respectively, and a position, in which the die members form a throat containing the end portions of the wrap, means for forcing a blank edgewise into the throat to form a clip tightly enclosing the ends of the twine wrap, and means for moving said movable die member between said positions.

5. In a bundle tying machine having a table for supporting a bundle and a gripper for holding one end of a length of twine, the combination of an arm engaging the twine between the gripper and a twine supply and rotatable through arcs of multiples of 360° in a single tying operation of the machine to lay a wrap of twine in a plane around a bundle on the table, a mounting at one end of the table supporting the arm for rotation on an axis through the portion of the arm in the mounting, the arm having a section extending along the side of the table and describing a surface of revolution upon rotation of the arm, a stationary die member having a channel in its face for receiving the end portions of a twine wrap held by the gripper and the arm, respectively, a second die member having a channel in its face, the two members being mounted outside the space defined by said surface of revolution and the second die member being movable rotationally and rectilinearly into engagement with the first to cause the channels to form a throat containing the end portions of the wrap, means for forcing a blank edgewise into the throat to form a clip tightly enclosing the end portions of the twine wrap, and means for moving the second die member into and out of engagement with the stationary die member.

6. In a bundle tying machine having a table for supporting a bundle and a gripper for holding one end of a length of twine, the combination of an arm engaging the twine between the gripper and a twine supply and mounted at one side of the table, the arm being rotatable through arcs of multiples of 360° to lay a wrap of twine in a plane around a bundle on the table, the arm having a section, which extends along the side of the table and describes a surface of revolution upon rotation of the arm, a stationary die member having a channel in its face for receiving the ends of a twine wrap held by the gripper and the arm, respectively, a second die member having a channel in its face, the two members being mounted outside the space defined by said surface of revolution and at the side of the wrapping plane remote from the arm mounting, and the second die member being movable into engagement with the first to cause the channels to form a throat containing said wrap ends, said die members having portions cooperating, when the members are engaged, to define a tangential entrance into the throat, means for forcing a blank edgewise through the entrance into the throat to form a clip tightly enclosing the ends of the twine wrap, and means for moving the second die member into and out of engagement with the stationary die member.

7. In a bundle tying machine having a table for supporting a bundle and a gripper for holding one end of a length of twine, the combination of an arm engaging the twine between the gripper and a twine supply and mounted at one end of the table, the arm being rotatable through arcs of multiples of 360° in a single tying operation of the machine to lay a wrap of twine in a plane around a bundle on the table, the arm having a section, which extends along the side of the table and describes a surface of revolution upon rotation of the arm, a pair of die members, one fixed and one movable, mounted at the side of the wrapping plane remote from the arm mounting and outside the space defined by said surface of revolution, means for moving the movable die member between a position, in which the members are spaced to receive between them the end portions of a twine wrap held by the gripper and the arm, respectively, and a position, in which the die members form a throat containing the end portions of the wrap, and means for feeding a strip endwise and severing end sections successively therefrom to form blanks, means for forcing single blanks edgewise and in the direction of the feeding movement of the strip into the throat to form a clip tightly enclosing the end portions of the twine wrap.

8. In a bundle tying machine, the combination of a table for supporting a bundle, a gripper for initially holding the end of a piece of twine drawn from a supply, an arm engaging the twine between the gripper in its initial position and the supply and rotatable through arcs of multiples of 360° in a single tying operation of the machine to lay a wrap of the twine about a bundle on the table, the arm having an end section supported at one end of the table for rotation on the axis of the section and having another section lying offset from the first and extending along the side of the table, the twine wrap lying in a plane with its end portions extending in opposite directions, means for forming a clip about the end portions of the twine to hold them tightly together, means for shifting the gripper bodily with a movement of translation after formation of the clip from its initial position to a second position at the opposite side of the clip, and means for opening the gripper adjacent one end of its path, and means for closing the gripper adjacent the other end of its path.

9. In a bundle tying machine, the combination of a table for supporting a bundle, a combined scissor-gripper operable in an initial position to hold twine drawn from a supply, an arm engaging the twine between the gripper in its initial position and the supply and rotatable through arcs of multiples of 360° in a single tying operation of the machine to lay a wrap of twine about a bundle on the table, the arm having an end section supported at one end of the table for rotation on the axis of the section and having another section lying offset from the first and extending along the side of the table, the twine wrap lying in a plane with its end portions extending in opposite directions, means at one side of the scissor-gripper in its initial position for applying a clip to the end portions of the twine to hold them together, means for shifting the scissor-gripper bodily with a movement of translation after application of the clip from its initial position to a second position at the opposite side of the clip, means operating the scissor-gripper at one end of its path to cause it to grip the twine between the clip and the supply and thereafter to cut the twine between the clip and the place where the twine is gripped, and means operating the scissor-gripper at the other end of its path to open both the scissor and the gripper.

10. In a bundle tying machine, the combination of a table for supporting a bundle, a gripper for holding twine drawn from a supply, means engaging the twine between the gripper and the supply and operable to wind the twine about a bundle on the table to form a wrap lying in a plane with the end portions of the twine in the wrap extending in substantially opposite directions, a shearing device, including a reciprocating slide, means for advancing a strip lengthwise and substantially normal to the plane of the twine wrap, the strip being moved stepwise and coming to rest with its end section supported by the slide, means for moving the slide to sever said end section from the strip to form a slug, die means operable to form a throat receiving said twine ends, said throat having an entrance opening, and a reciprocating punch engaging the slug supported on the slide and movable toward said opening and throat to advance the slug through the opening and into the throat to be formed by the die means into a clip tightly enclosing said twine ends.

11. In a bundle tying machine, the combination of a table for supporting a bundle, means for holding the end of twine drawn from a supply, an arm engaging the twine between the supply and holding means and rotatable through arcs of multiples of 360° to lay a wrap of twine in a plane about a bundle on the table with the end portions of the twine in the wrap extending in substantially opposite directions, the arm having a section, which extends along the side of the table and describes a surface of revolution upon rotation of the arm, a fixed die member lying at the side of said plane remote from the arm and having a channel receiving the end portions of the twine, a second die member mounted outside the space within said surface of revolution and at the same side of the plane as the fixed die member, the second die member having a channel, means for swinging the second die member about an axis parallel to said plane through an arc intersecting the plane to cause the die members to face each other, means operating after the second die member has been swung to move it substantially rectilinearly into engagement with the fixed die member to cause the channels in said members to form a throat containing end portions of the twine, and means for inserting a slug into the throat and folding it about the twine ends to form a holding clip.

12. In a bundle tying machine, the combination of a table, a scissor-gripper closable to grip a twine drawn from a supply and to sever the twine at the side of the point of gripping remote from the supply, an arm engaging the twine between the supply and the scissor-gripper and rotatable to lay a wrap of twine about a bundle on the table, means for rotating the arm, means for folding a slug about the ends of the twine in each wrap to form a clip securing the twine ends, means for moving the scissor-gripper along a path, means for opening the scissor-gripper at one end of the path and closing the scissor-gripper at the other end of the path, means, including a cam shaft, for operating the moving means, opening and closing means, and the folding means, a continuously operating drive shaft, a clutch for connecting the drive shaft and the cam shaft, and means operable by the cam shaft upon completion of a rotation thereof for disengaging the clutch.

13. A bundle tying machine having a table for supporting a bundle, a gripper for holding the end of a length of twine drawn from a supply, an arm engaging the twine between the gripper and the supply and mounted at one end of the table for rotation, the arm having an end section extending along the side of the table and describing a surface of revolution upon rotation of the arm, means for rotating the arm through arcs of multiples of 360° in a single tying operation of the machine to lay a wrap of twine in a plane around a bundle on the table, a gripper for holding an end portion of the twine, a pair of die members mounted at one side of the gripper and outside the space within said surface of revolution, the members being relatively movable to separate them for receiving between them end portions of a twine wrap held by the gripper and the arm, respectively, and said members being also relatively movable to engage and form a throat containing end portions of the wrap, one of the die members moving through said plane to engage the other, means for forcing a blank edgewise into said throat to form a clip tightly enclosing the end portions of the twine wrap, means for opening the gripper, means for moving the open gripper past the clip and to a position in which the gripper has received the twine between the clip and the arm, means for closing the gripper on the twine, means for severing the twine between the clip and the closed gripper, means for returning the closed gripper to its initial position, and means for imparting relative movement to the die members.

14. A bundle tying machine as defined in claim 13, in which both die members are mounted at the side of the plane of the twine wrap remote from the mounting for the arm, one die member is fixed and the second can be swung through said plane into engagement with the fixed die member, and the gripper is movable with a movement of translation through an arcuate path of at least 180° from side to side of the plane of the swinging movement of the second die member.

References Cited in the file of this patent

UNITED STATES PATENTS

| | | |
|---|---|---|
| 138,027 | House | Apr. 22, 1873 |
| 218,774 | Richardson | Aug. 19, 1879 |
| 658,206 | Collins | Sept. 18, 1900 |
| 1,039,853 | Ware | Oct. 1, 1912 |
| 1,499,703 | Spry | July 1, 1924 |
| 2,198,440 | Marchand | Apr. 23, 1940 |
| 2,443,470 | Marchand | June 15, 1948 |